United States Patent
Ohta et al.

(10) Patent No.: US 12,216,024 B2
(45) Date of Patent: Feb. 4, 2025

(54) SIGNAL ANALYSIS DEVICE, SIGNAL ANALYSIS METHOD, AND RECORDING MEDIUM

(71) Applicant: NEC Corporation, Tokyo (JP)

(72) Inventors: Yuko Ohta, Tokyo (JP); Reishi Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 210 days.

(21) Appl. No.: 17/802,410

(22) PCT Filed: Mar. 18, 2020

(86) PCT No.: PCT/JP2020/011871
§ 371 (c)(1),
(2) Date: Aug. 25, 2022

(87) PCT Pub. No.: WO2021/186597
PCT Pub. Date: Sep. 23, 2021

(65) Prior Publication Data
US 2023/0085975 A1    Mar. 23, 2023

(51) Int. Cl.
*G01M 17/00*    (2006.01)
*G01M 17/08*    (2006.01)

(52) U.S. Cl.
CPC .................. *G01M 17/08* (2013.01)

(58) Field of Classification Search
CPC .............................. G01M 17/08; G01H 17/00
See application file for complete search history.

(56) References Cited

U.S. PATENT DOCUMENTS

| | | | |
|---|---|---|---|
| 10,055,192 B1* | 8/2018 | Shau | G06F 3/167 |
| 2010/0131800 A1 | 5/2010 | Fujimaki et al. | |
| 2011/0227744 A1 | 9/2011 | Shibata et al. | |
| 2015/0221321 A1* | 8/2015 | Christian | G10L 25/48 700/94 |
| 2017/0103776 A1* | 4/2017 | Kim | G10L 25/24 |
| 2018/0219521 A1* | 8/2018 | Arimoto | G10H 1/057 |
| 2019/0073618 A1* | 3/2019 | Kanukurthy | G08B 21/02 |
| 2019/0082256 A1* | 3/2019 | Robbins | G06V 20/62 |
| 2019/0277986 A1* | 9/2019 | Myers | G01H 3/08 |
| 2020/0020328 A1* | 1/2020 | Gordon | G10L 15/08 |
| 2020/0135163 A1* | 4/2020 | Lovitt | G10K 11/17837 |
| 2021/0050023 A1* | 2/2021 | Hume | H04S 3/008 |
| 2021/0076147 A1* | 3/2021 | Delaporte | B61L 15/0027 |

FOREIGN PATENT DOCUMENTS

| | | |
|---|---|---|
| JP | H03-293523 A | 12/1991 |
| JP | H07-241895 A | 9/1995 |
| JP | H07-241896 A | 9/1995 |

(Continued)

OTHER PUBLICATIONS

International Search Report for PCT Application No. PCT/JP2020/011871, mailed on Jun. 23, 2020.

(Continued)

*Primary Examiner* — Long T Tran

(57) ABSTRACT

This signal analysis device provides information to assist determining the state of a time series signal. An identification unit (120) identifies events included in the time series signal, and a ranking generation unit (140) generates a ranking among multiple event types.

8 Claims, 7 Drawing Sheets

(56) References Cited

FOREIGN PATENT DOCUMENTS

| | | |
|---|---|---|
| JP | H11-143529 A | 5/1999 |
| JP | 2002-139377 A | 5/2002 |
| JP | 2010-156152 A | 7/2010 |
| JP | 2013-142870 A | 7/2013 |
| JP | 2015-156578 A | 8/2015 |
| JP | 2015-176285 A | 10/2015 |
| JP | 6061782 B | 1/2017 |
| JP | 2017-067929 A | 4/2017 |
| WO | 2008/114863 A1 | 9/2008 |
| WO | 2019/138073 A1 | 7/2019 |

OTHER PUBLICATIONS

English translation of Written opinion for PCT Application No. PCT/JP2020/011871, mailed on Jun. 23, 2020.
JP Office Action for JP Application No. 2022-508689, mailed on Jul. 18, 2023 with English Translation.

* cited by examiner

SIGNAL ANALYSIS DEVICE, SIGNAL ANALYSIS METHOD, AND RECORDING MEDIUM

This application is a National Stage Entry of PCT/JP2020/011871 filed on Mar. 18, 2020, the contents of all of which are incorporated herein by reference, in their entirety.

TECHNICAL FIELD

The present invention relates to a signal analysis device, a signal analysis method, and a recording medium, and more particularly, to a signal analysis device, a signal analysis method, and a recording medium for analyzing a time-series signal.

BACKGROUND ART

Periodic inspection of railway vehicles is performed in order to maintain safety of railway operation and to manage a vehicle state. When an abnormality occurs, an inspector goes to the site and conducts an inspection as needed. In a related technology, states of various devices and components mounted on a target are monitored using sensors for the purpose of quickly finding an abnormality of the target.

For example, a related technology described in PTL 1 collects acoustic data by a microphone installed at a predetermined position of a railway vehicle (an example of an inspection target). PTL 1 describes a technology in which frequency analysis is performed on data subjected to Fourier transform after performing Fourier transform on acoustic data to detect an abnormal sound generated by a railway vehicle.

CITATION LIST

Patent Literature

[PTL 1] JP 6061782 B2
[PTL 2] JP 2002-139377 A
[PTL 3] JP 2013-142870 A

SUMMARY OF INVENTION

Technical Problem

The related technology described in PTL 1 cannot identify an abnormal sound detected from a time-series signal. Therefore, a specialized inspector gets on a railway vehicle and actually listens to a sound in the railway vehicle to identify an abnormal sound based on knowledge and experience, thereby specifying a cause of an abnormality occurring in the railway vehicle. However, in a case of some abnormal sounds, a crew member or a new inspector who does not have sufficient experience and knowledge may be difficult to accurately specify the cause of the abnormality even if the crew member or the new inspector can hear the actual sound.

The present invention has been made in view of the above problems, and an object of the present invention is to provide information for assisting in determining a state of a time-series signal.

Solution to Problem

A signal analysis device according to an aspect of the present invention includes: detection means configured to detect an event included in a time-series signal; and ranking generation means configured to generate a ranking of a plurality of types of the detected events.

A signal analysis method according to an aspect of the present invention includes: detecting an event included in a time-series signal; and generating a ranking of a plurality of types of the detected events.

A recording medium according to an aspect of the present invention stores a program for causing a computer to perform: detecting an event included in a time-series signal; and generating a ranking of a plurality of types of the detected events.

Advantageous Effects of Invention

According to an aspect of the present invention, it is possible to provide information for assisting in determining a state of a time-series signal.

EXAMPLE EMBODIMENT

First Example Embodiment

Figure 1:
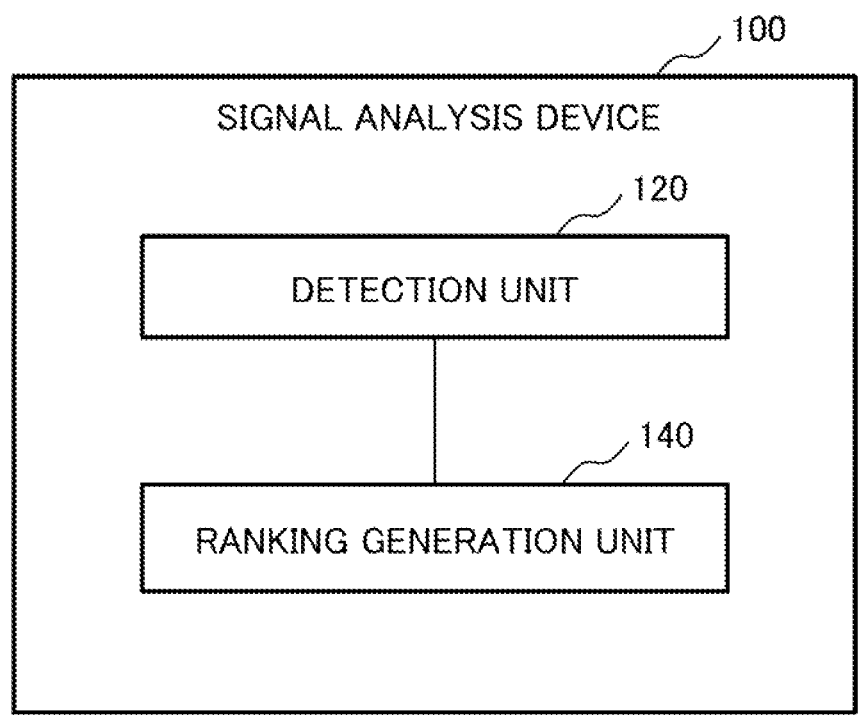
FIG. 1 is a block diagram illustrating a configuration of a signal analysis device according to a first example embodiment.

A first example embodiment will be described with reference to FIGS. 1 and 2.
(Signal Analysis Device 100)

A configuration of a signal analysis device 100 according to the first example embodiment will be described with reference to FIG. 1. FIG. 1 is a block diagram illustrating a configuration of the signal analysis device 100. As illustrated in FIG. 1, the signal analysis device 100 includes a detection unit 120 and a ranking generation unit 140.

The detection unit 120 detects an event included in a time-series signal. The detection unit 120 is an example of detection means. In the first example embodiment, a case where the event is an abnormal sound generated when a railway vehicle travels will be described. However, the event is not limited to an abnormal sound. As described in a third example embodiment, in another example, the event may be a vibration caused by a loose screw of a seat or a current waveform caused by an abnormality occurring in a device in a power distribution board.

Specifically, the detection unit 120 first acquires a time-series signal. For example, while a railway vehicle (an example of an inspection target) is in operation, the detection unit 120 acquires a time-series signal from sound collection equipment (for example, a microphone) installed in the railway vehicle. Alternatively, the detection unit 120 may acquire a time-series signal that is not in real time when an inspection of the railway vehicle is performed. For example, the detection unit 120 reproduces a time-series signal already recorded in a recording medium (not illustrated).

Next, the detection unit 120 divides the time-series signal into a plurality of time-series signals by dividing the time-series signal for each acoustic section in a certain period. The detection unit 120 inputs a time-series signal of a certain period to a detector. The detection unit 120 detects an abnormal sound included in a certain period of a time-series signal by using the detector that has learned a feature of the abnormal sound (an example of the event) in advance. Every time a time-series signal of a certain period is input from the detection unit 120, the detector detects an abnormal sound included in the time-series signal of the certain period. The feature of the abnormal sound includes, for example, at least one of an amplitude of the abnormal sound, a fundamental frequency component of the abnormal sound, a mel-frequency cepstrum coefficient (MFCC), or a spectral envelope.

Figure 2:
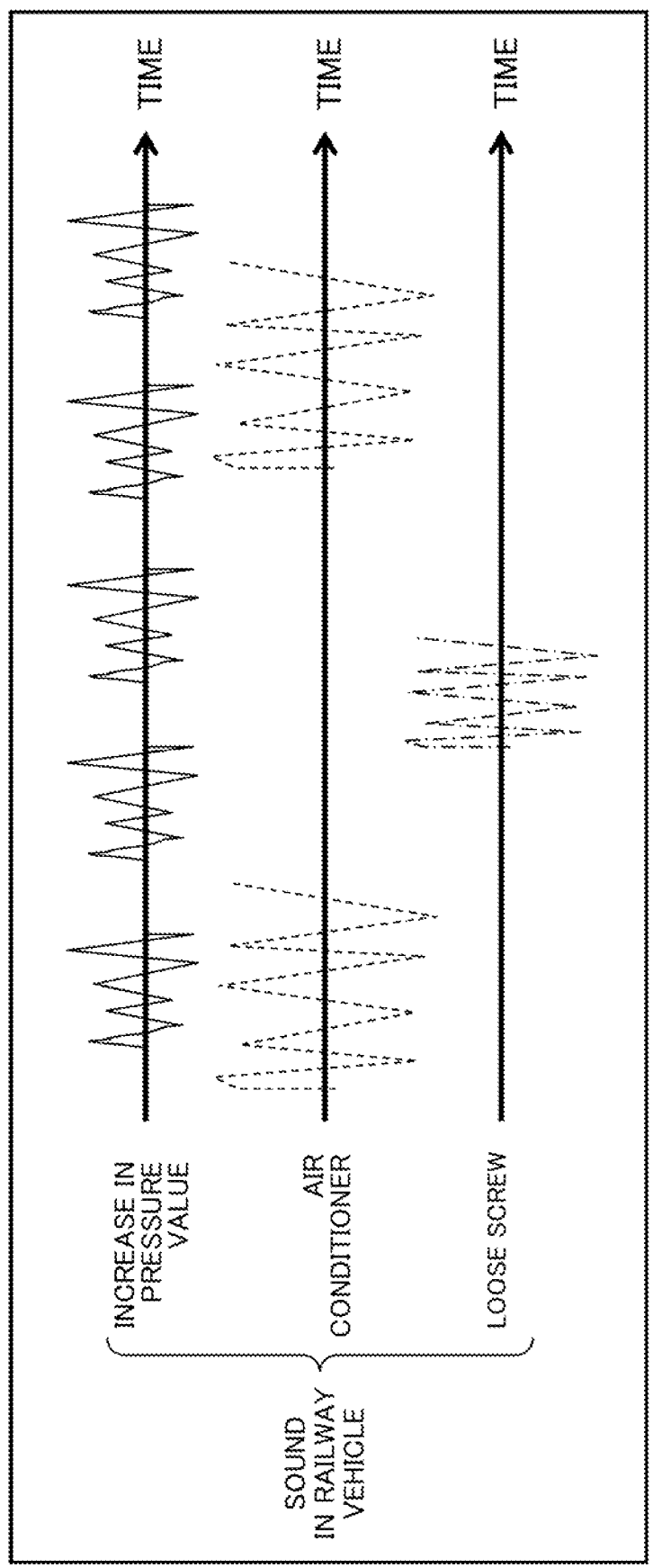
FIG. 2 is a diagram illustrating an example of various abnormal sounds included in a time-series signal.

FIG. 2 illustrates an example of various abnormal sounds included in a certain period of a time-series signal ("sound in railway vehicle" in FIG. 2) acquired in a railway vehicle. FIG. 2 illustrates, as an example of three types of abnormal sounds, an abnormal sound caused by a loose screw of a seat of a railway vehicle, an abnormal sound caused by an increase in pressure value in a railway vehicle, and an abnormal sound caused by malfunction of an air conditioner installed in a railway vehicle. In the time-series signal acquired by the detection unit 120, these sounds in a railway vehicle are superimposed on a traveling sound of the railway vehicle (not illustrated). The abnormal sounds illustrated in FIG. 2 are important sounds of interest to crews and inspectors. Meanwhile, an announcement sound and a sound of opening a can are not sounds of interest to crews and inspectors and are thus not "abnormal sounds" defined in the first example embodiment.

The abnormal sound means a sound related to a failure, damage, or other trouble of a railway vehicle (an example of the inspection target). In other words, the abnormal sound is a sound emitted by a railway vehicle when an abnormality occurs in the railway vehicle.

The detection unit 120 outputs a result of detecting the abnormal sound to the ranking generation unit 140. In addition, the detection unit 120 may output the result of detecting the abnormal sound to an external device or a network.

The ranking generation unit 140 generates a ranking of a plurality of types of abnormal sounds. The ranking generation unit 140 is an example of ranking generation means. For example, the ranking generation unit 140 measures the number of times that the abnormal sound has been detected (the number of detections) for each type of abnormal sound, and generates a ranking of the numbers of detections of the plurality of types of abnormal sounds.

After a predetermined number or more of abnormal sounds are detected by the detection unit 120 described above, the ranking generation unit 140 may output information based on the ranking of the numbers of detections. For example, the ranking generation unit 140 causes a display device to display, in a form of a graph, a rate of detection that is a ratio of the numbers of detections of the plurality of types of abnormal sounds. As a result, a user viewing the displayed graph can determine the state of the time-series signal and specify or estimate the cause of the abnormal sound.

Modified Example

In one modified example, the detection unit 120 calculates the degree of matching between data of a certain period of a time-series signal and reference data (also referred to as an acoustic model) for each type of abnormal sound. The degree of matching is a ratio or value that indicates how much the data of the certain period of the time-series signal matches (or is similar to) the reference data. The degree of matching may be used as an evaluation value described in a second example embodiment.

For example, the detection unit 120 obtains the above-described degree of matching by dividing the maximum value of a cross-correlation function between the data of the certain period of the time-series signal and the reference data corresponding to the same certain period by the maximum value of an autocorrelation function of the data of the certain period of the time-series signal.

The detection unit 120 according to the present modified example specifies reference data having the highest degree of matching by calculating the degree of matching for each reference data. In a case where the highest degree of matching exceeds a threshold value, the detection unit 120 determines that the data of the certain period of the time-series signal is an abnormal sound of a type indicated by the specified reference data.

Effects of Present Example Embodiment

According to the configuration of the present example embodiment, the detection unit 120 detects an abnormal sound included in a time-series signal. The ranking generation unit 140 generates a ranking of a plurality of types of abnormal sounds.

Therefore, the signal analysis device 100 can provide information for assisting in determining a state of a time-series signal based on a result indicating the ranking generated by the ranking generation unit 140.

Second Example Embodiment

The second example embodiment will be described with reference to FIGS. 3 to 6.

(Signal Analysis Device 200)

Figure 3:
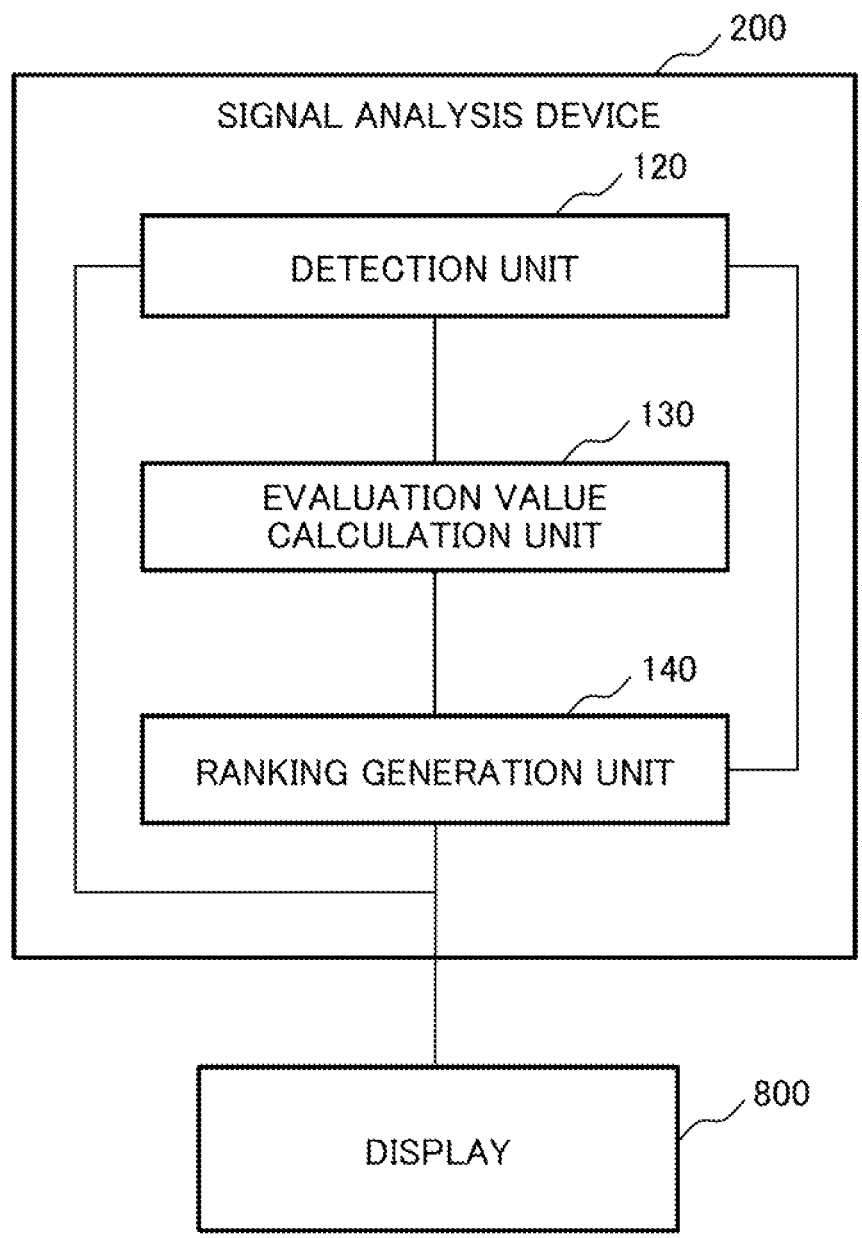
FIG. 3 is a block diagram illustrating a configuration of a signal analysis device according to a second example embodiment.

A configuration of a signal analysis device 200 according to the second example embodiment will be described with reference to FIG. 3. FIG. 3 is a block diagram illustrating a configuration of the signal analysis device 200. As illustrated in FIG. 3, the signal analysis device 200 includes a detection unit 120 and a ranking generation unit 140. The signal analysis device 200 further includes an evaluation value calculation unit 130.

The evaluation value calculation unit 130 calculates an evaluation value for each type of detected abnormal sound. The evaluation value calculation unit 130 is an example of evaluation value calculation means. Specifically, the evaluation value calculation unit 130 may calculate, as the evaluation value, a cumulative value of time when an abnormal sound has appeared in a time-series signal for each type of abnormal sound. In a case where an abnormal sound has appeared in a time-series signal a plurality of times, the evaluation value calculation unit 130 calculates the evaluation value by adding all the times when the abnormal sound has appeared.

Alternatively, the evaluation value calculation unit 130 may calculate the evaluation value for each type of abnormal sound based on reliability (also referred to as a score) indicating the certainty of a detection result from the detection unit 120. The higher (lower) the certainty of the result of detecting the abnormal sound, the higher (lower) the score. In an example, the evaluation value calculation unit 130 sets a total sum or a maximum value of scores obtained within a predetermined period as the evaluation value.

Alternatively, the evaluation value calculation unit 130 may acquire the degree of matching described in the modified example of the first example embodiment from the detection unit 120 as the evaluation value. The evaluation value in this case indicates how much data of the abnormal sound matches reference data for each type of abnormal sound indicated by the detection result. The detection unit 120 outputs data of the evaluation value calculated in this manner to the ranking generation unit 140.

The ranking generation unit 140 generates a ranking of the numbers of detections of a plurality of types of abnormal sounds based on the evaluation value for each type of abnormal sound. The number of detections of the abnormal sound is an example of the evaluation value.

The ranking generation unit 140 extracts several (for example, three to five) types of abnormal sounds in descending order of the evaluation value from among the types of abnormal sounds detected by the detection unit 120. For example, the ranking generation unit 140 measures the number of detections of each abnormal sound from the time-series signal until a predetermined number or more of abnormal sounds are detected by the detection unit 120. Alternatively, the ranking generation unit 140 may measure the number of detections for all types of abnormal sounds detected by the detection unit 120.

Next, the ranking generation unit 140 generates a ranking of the numbers of detections of the plurality of types of abnormal sounds.

In an example, after a predetermined number or more of abnormal sounds are detected by the detection unit 120, the ranking generation unit 140 outputs information based on the ranking. The ranking generation unit 140 may cause a display 800 to display a graph indicating a rate of detection for each type of abnormal sound. Alternatively, the detection unit 120 may cause the display 800 to display the result of detecting the abnormal sound together with the graph indicating the rate of detection.

Figure 4:
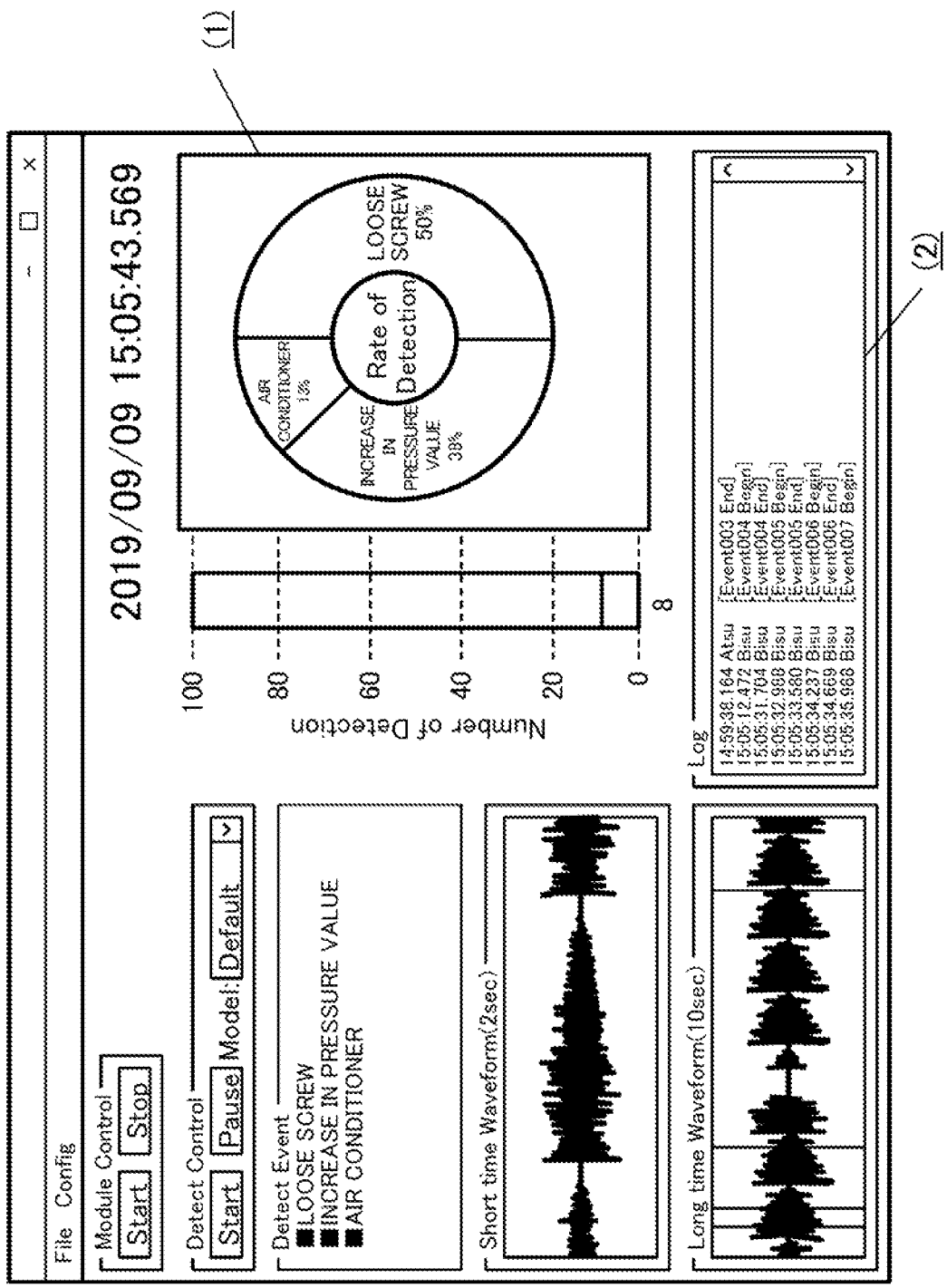
FIG. 4 is an example of a screen displayed on a display by the signal analysis device according to the second example embodiment.

FIG. 4 is an example of a screen displayed on the display 800 by the signal analysis device 200 according to the second example embodiment.

(1) of FIG. 4 illustrates the ranking of the numbers of detections of the plurality of types of abnormal sounds. Here, three examples of the abnormal sound include "an abnormal sound caused by a loose screw", "an abnormal sound caused by an increase in pressure value", and "an abnormal sound caused by malfunction of an air conditioner". In (1) of FIG. 4, "the abnormal sound caused by a loose screw", "the abnormal sound caused by an increase in pressure value", and "the abnormal sound caused by malfunction of an air conditioner" are indicated as "loose screw", "increase in pressure value", and "air conditioner", respectively. As described above, the rate of detection means a ratio of the numbers of detections of the plurality of types of abnormal sounds. In the example illustrated in (1) of FIG. 4, the rates of detection of the abnormal sounds are "loose screw" (50%), "increase in pressure value" (38%), and "air conditioner" (13%), respectively. However, since the percentage value is rounded off to the first decimal place, the total is not exactly 100% in some cases.

(2) of FIG. 4 illustrates a result of detecting the abnormal sound by the detection unit 120. More specifically, in (2) of FIG. 4, a time (start) at which the abnormal sound starts to appear in the time-series signal, the type of the detected abnormal sound, and a time (end) at which the abnormal sound disappears from the time-series signal are displayed in a log field. In (2) of FIG. 4, "Atsu" means "increase in pressure value". "Bisu" means "loose screw".

In the example described here, the evaluation value calculation unit 130 measures the number of times an abnormal sound has appeared in a time-series signal. In another example, the evaluation value calculation unit 130 may calculate, as the evaluation value, a cumulative value of time when an abnormal sound has appeared in a time-series signal for each type of abnormal sound. The signal analysis device 200 may allow a user to set or change a method of calculating the evaluation value. The evaluation value calculation unit 130 outputs data of the calculated evaluation value to the ranking generation unit 140.

The ranking generation unit 140 receives the data of the evaluation value from the evaluation value calculation unit 130. The ranking generation unit 140 can generate a ranking of the plurality of types of abnormal sounds by using the evaluation value for each type of abnormal sound. The ranking generation unit 140 may exclude a specific type of abnormal sound from the ranking based on a predetermined input operation.

For example, the ranking generation unit 140 receives an input operation to select (check) the type of the abnormal sound with respect to a "Detect Event" box illustrated on the left side of FIG. 4. Thereafter, the ranking generation unit 140 excludes the types of abnormal sounds that are not selected from the graph illustrated in (1) of FIG. 4, and generates a ranking of the numbers of detections of the remaining types of abnormal sounds. Then, the ranking generation unit 140 calculates the rate of detection for each type of abnormal sound again based on the generated ranking of the numbers of detections, and displays a graph of the rate of detection on the display 800.

(Operation of Signal Analysis Device 200)

Figure 5:
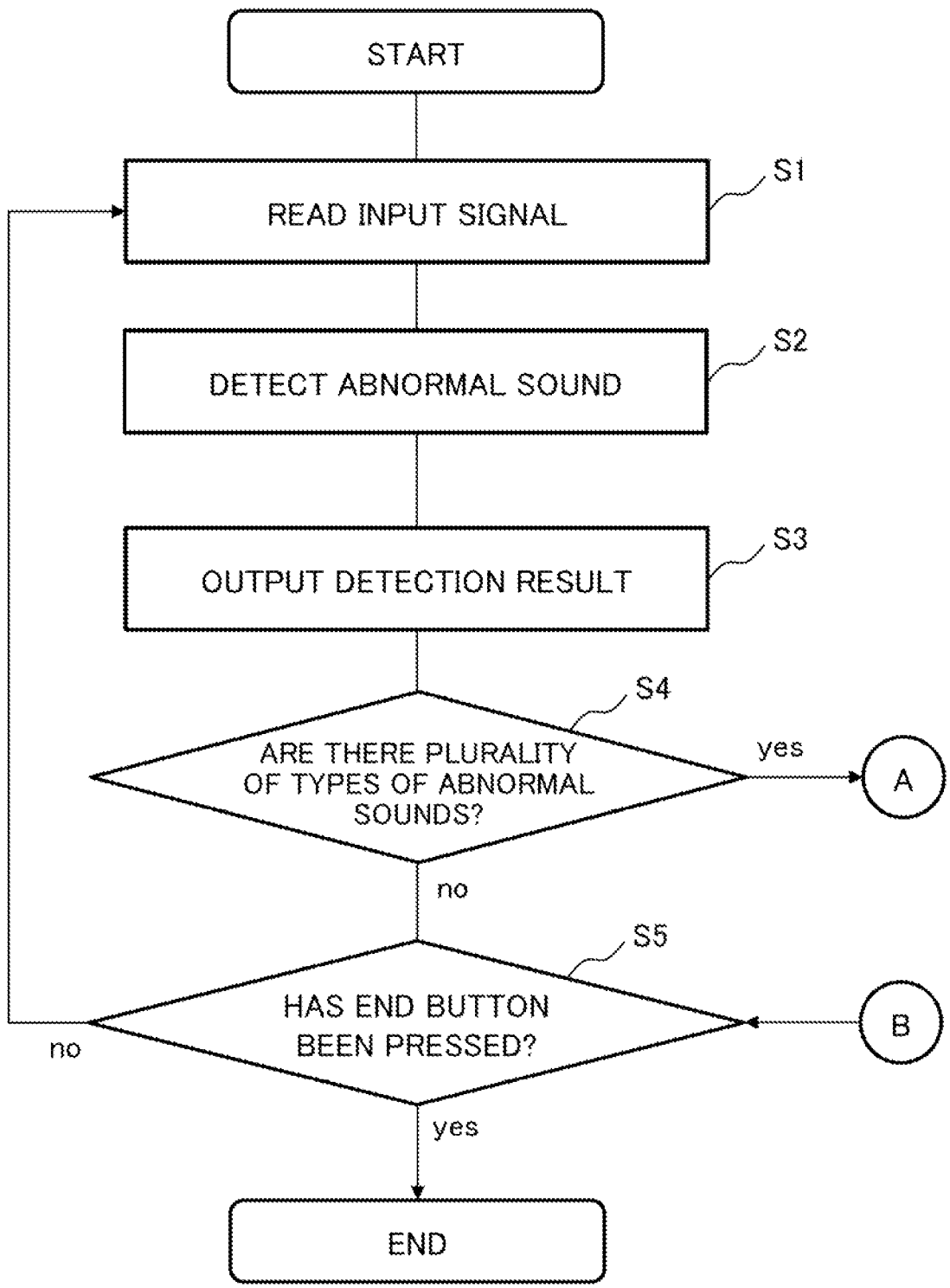
FIG. 5 is a flowchart illustrating an operation of the signal analysis device according to the second example embodiment.
Figure 6:
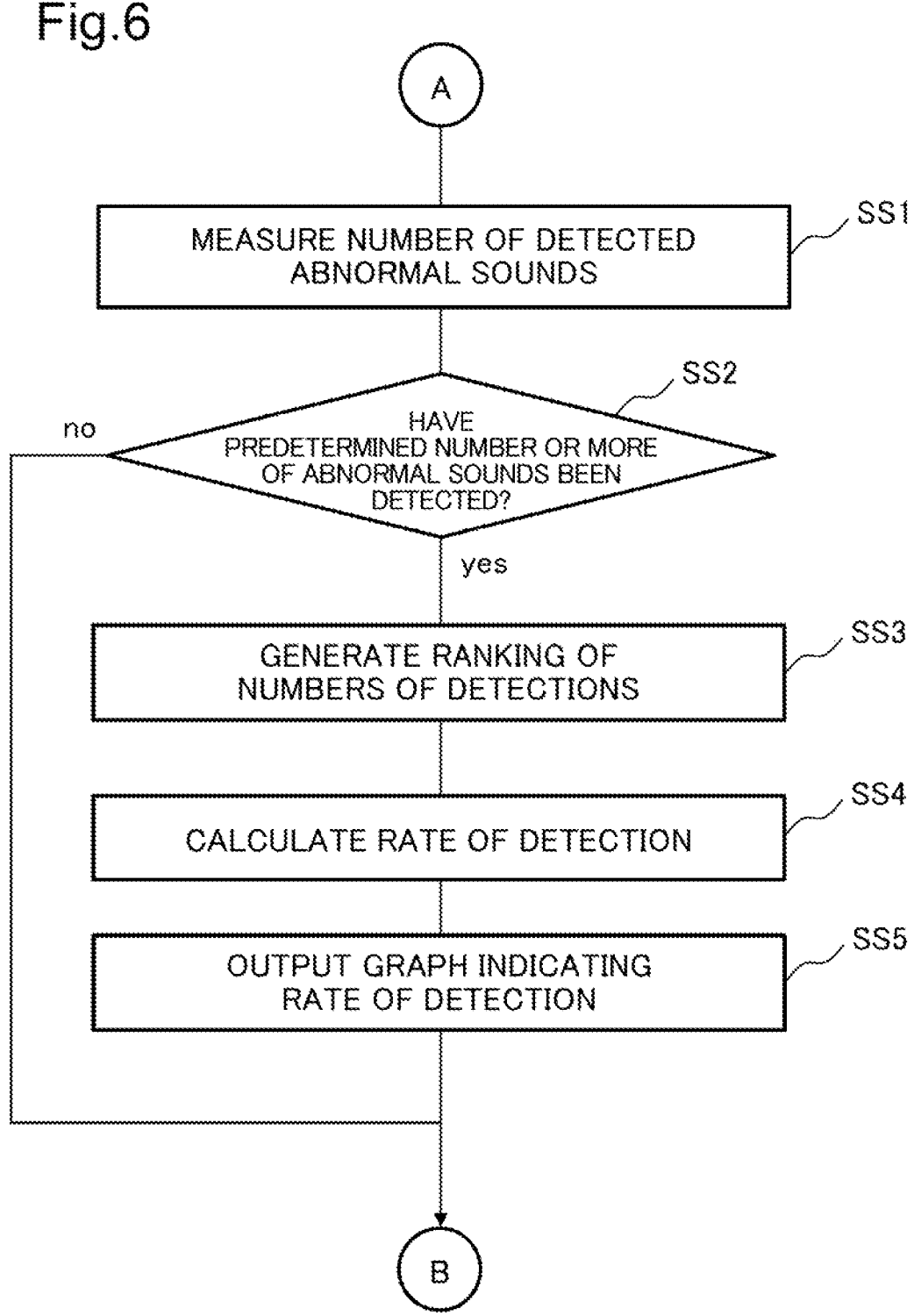
FIG. 6 is a flowchart illustrating an operation of the signal analysis device according to the second example embodiment.

The operation of the signal analysis device 200 according to the second example embodiment will be described with reference to FIGS. 5 and 6. FIGS. 5 and 6 are flowcharts illustrating a flow of a series of processing performed by the units of the signal analysis device 200.

As illustrated in FIG. 5, the detection unit 120 of the signal analysis device 200 reads a time-series signal from a microphone installed in a railway vehicle (S1).

Next, the detection unit 120 detects an abnormal sound included in the time-series signal by using a detector that has learned in advance a feature of each type of abnormal sound (S2).

Specifically, in Step S2, the detection unit 120 detects the abnormal sound by collating data of the abnormal sound with reference data for each type of abnormal sound acquired in advance.

The detection unit 120 outputs a result of detecting the abnormal sound to an external device or a network (S3). For example, the detection unit 120 causes the display 800 (FIG. 4) to display the result of detecting the abnormal sound.

Then, the detection unit 120 determines whether there are a plurality of types of abnormal sounds (S4). In a case where there is only one type of abnormal sound (no in S4), the flow proceeds to Step S5.

On the other hand, in a case where there are a plurality of types of abnormal sounds (yes in S4), the detection unit 120 outputs the result of detecting the abnormal sound to the ranking generation unit 140. In this case, the flow proceeds to Step SS1 illustrated in FIG. 6 (to A of FIG. 5).

As illustrated in FIG. 6, first, the ranking generation unit 140 measures the number of times that the abnormal sound has been detected (the number of detections) for each type of abnormal sound (SS1). In a case where the detection unit 120 has not yet detected a predetermined number or more of abnormal sounds (no in SS2), the flow proceeds to Step S5 in FIG. 5 (to B in FIG. 6).

On the other hand, in a case where the detection unit 120 has detected a predetermined number or more of abnormal sounds (yes in SS2), the ranking generation unit 140 generates a ranking of the numbers of detections of the plurality of types of abnormal sounds (SS3).

The ranking generation unit 140 calculates the rate of detection that is a ratio of the numbers of detections of the plurality of types of abnormal sounds (SS4).

The ranking generation unit 140 outputs a graph (see FIG. 4) indicating the calculated rate of detection (SS5). Thereafter, the flow proceeds to Step S5 in FIG. 5 (to B in FIG. 6).

In a case where a user has pressed an end button in Step S5 illustrated in FIG. 5 (Yes in S5) after Step SS5 illustrated in FIG. 6, the flow ends. On the other hand, in a case where the user has not yet pressed the end button (no in S5), the flow returns to Step S1.

The description of the operation of the signal analysis device 200 according to the second example embodiment is ended. A case where the inspection target is a railway vehicle has been described in the second example embodiment, but the application example of the present invention is not limited to the railway vehicle. In another example, the inspection target may be transportation means such as an automobile, a bus, a ship, or an airplane, or may be a power generation facility, a boiler room, a machine room, or a water supply pipe and a sewage pipe. More generally, the signal analysis device 200 according to the second example embodiment can be used to determine or estimate the state of the inspection target by analyzing the time-series signal.

(Effects of Present Example Embodiment)

According to the configuration of the present example embodiment, the detection unit 120 detects an abnormal sound included in a time-series signal. The ranking generation unit 140 generates a ranking of a plurality of types of abnormal sounds.

The signal analysis device 200 may provide information for assisting in determining the state of the time-series signal based on a result indicating the ranking of the plurality of types of abnormal sounds.

According to the configuration of the present example embodiment, the evaluation value calculation unit 130 calculates the evaluation value for each type of detected abnormal sound. Therefore, the ranking generation unit 140 can generate the ranking of the plurality of types of abnormal sounds based on the evaluation value for each type of abnormal sound. For example, as described in the second example embodiment, the ranking generation unit 140 generates a ranking of the numbers of detections of the plurality of types of abnormal sounds.

Third Example Embodiment

The third example embodiment will be described with reference to FIGS. 1 and 3. A configuration of a signal analysis device according to the third example embodiment is similar to the signal analysis device 100 (FIG. 1) described in the first example embodiment or the signal analysis device 200 (FIG. 3) described in the second example embodiment.

In the third example embodiment, the signal analysis device (100 or 200) provides information for assisting in determining a state of a time-series signal including a plurality of vibrations or current waveforms (hereinafter, referred to as vibrations/current waveforms) instead of a plurality of abnormal sounds. In the third example embodiment, the detection unit 120 detects the vibrations/current waveforms included in the time-series signal. The ranking generation unit 140 generates a ranking of a plurality of types of vibrations/current waveforms. The ranking generation unit 140 may display a graph indicating a rate of detection for each type of vibration/current waveform on the display 800. Alternatively, the detection unit 120 may display a result of detecting the vibrations/current waveforms on the display 800 together with the graph indicating the rate of detection.

In an example, a vibration sensor is installed near a seat of a railway vehicle (an example of a target). The detection unit 120 causes the detector to learn in advance a feature of a vibration of the seat due to a loose screw fixing the seat. The detection unit 120 receives a time-series signal from the vibration sensor, and inputs the time-series signal to the detector. The detector outputs a result of detecting the vibration included in the time-series signal. The detection unit 120 outputs a result of detecting the vibration to the ranking generation unit 140. The result of detecting the vibration includes information indicating a plurality of types of vibrations and the number of times each vibration has been detected (the number of detections). The ranking generation unit 140 generates a ranking of the plurality of types of vibrations based on the result of detecting the vibration. The ranking generation unit 140 causes the display 800 to display the result of detecting the vibration together with the graph indicating the rate of detection.

In another example, a current sensor is installed in a device in a power distribution board. The detection unit 120 causes the detector to learn in advance a feature of a current waveform caused by an abnormality occurring in the device. The detection unit 120 receives a time-series signal from the current sensor, and inputs the time-series signal to the detector. The detector outputs a result of detecting the current waveform included in the time-series signal. The detection unit 120 outputs a result of detecting the current waveform to the ranking generation unit 140. The result of detecting the current waveform includes information indicating a plurality of types of current waveforms and the number of times each current waveform has been detected (the number of detections). In this example, a flow of processing performed by the ranking generation unit 140 is similar to that in the above-described example.

(Regarding Hardware Configuration)

Figure 7:
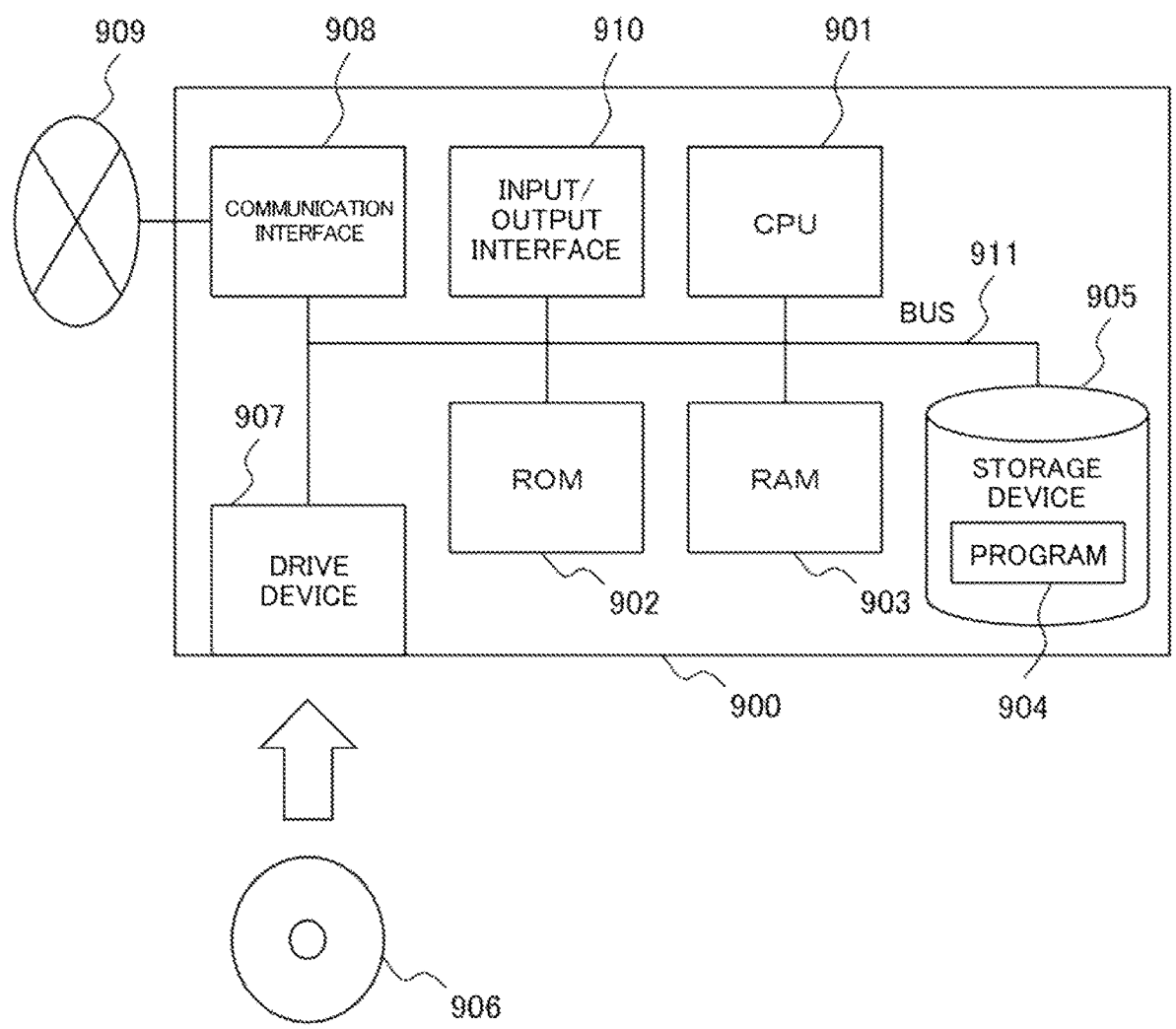
FIG. 7 is a diagram illustrating a hardware configuration of the signal analysis devices according to the first and second example embodiments.

The components of the signal analysis device 100 or 200 described in the first to third example embodiments indicate functional unit blocks. Some or all of these components are implemented by an information processing apparatus 900 as illustrated in FIG. 7, for example. FIG. 7 is a block diagram illustrating an example of a hardware configuration of the information processing apparatus 900.

As illustrated in FIG. 7, the information processing apparatus 900 has the following configuration by way of example.

A central processing unit (CPU) 901
A read only memory (ROM) 902
A random access memory (RAM) 903
A program 904 loaded to the RAM 903
A storage device 905 storing the program 904
A drive device 907 that performs reading and writing on a recording medium 906
A communication interface 908 connected to a communication network 909
An input/output interface 910 for inputting/outputting data
A bus 911 connecting the components The components of the signal analysis device described in the first to third example embodiments are implemented by the CPU 901 reading and executing the program 904 for implementing these functions. The program 904 for implementing the functions of the components is stored in the storage device 905 or the ROM 902 in advance, for example, and the CPU 901 loads the program to the RAM 903 and executes the program as necessary. The program 904 may be supplied to the CPU 901 via the communication network 909, or may be stored in advance in the recording medium 906, and the drive device 907 may read the program and supply the program to the CPU 901.

Effects of Present Example Embodiment

According to the configuration of the present example embodiment, the signal analysis device 100 or 200 described in the first to third example embodiments is implemented as hardware. Therefore, effects similar to the effects described in the above example embodiments can be obtained.

While the present invention has been particularly shown and described with reference to example embodiments (and examples) thereof, the present invention is not limited to these example embodiments (and examples). It will be understood by those of ordinary skill in the art that various changes in form and details of the example embodiments (and examples) may be made therein without departing from the spirit and scope of the present invention as defined by the claims.

REFERENCE SIGNS LIST 100 signal analysis device
120 detection unit
130 evaluation value calculation unit
140 ranking generation unit
200 signal analysis device

What is claimed is:

1. A signal analysis device comprising:
a memory storing instructions; and
at least one processor configured to execute the instructions to perform:
detecting events included in a time-series signal, each event having an event type;
calculating an evaluation value for each event type of the detected events; and
generating a ranking of a plurality of the event types of the detected events based on the evaluation value for each event type.

2. The signal analysis device according to claim 1, wherein
the at least one processor is configured to execute the instructions to perform:
outputting information based on the ranking after a predetermined number or more of the events are detected.

3. The signal analysis device according to claim 1, wherein
the at least one processor is configured to execute the instructions to perform:
calculating, as the evaluation value for each event type, a cumulative value of time in which the detected events having the event type have appeared in the time-series signal.

4. The signal analysis device according to claim 1, wherein
the at least one processor is configured to execute the instructions to perform:
calculating, as the evaluation value for each event type, a number of the detected events having the event type.

5. The signal analysis device according to claim 1, wherein the at least one processor is configured to execute the instructions to perform: calculating the evaluation value for each event type based on a detection reliability of the detected events having the event value.

6. The signal analysis device according to claim 1, wherein
the at least one processor is configured to execute the instructions to perform:
excluding a specific event type from the ranking based on a predetermined input operation.

7. A signal analysis method performed by a computer and comprising:
detecting events included in a time-series signal, each event having an event type;
calculating an evaluation value for each event type of the detected events; and
generating a ranking of a plurality of the event types of the detected events based on the evaluation value for each event type.

8. A non-transitory recording medium storing a program for causing a computer to perform:
detecting events included in a time-series signal, each event having an event type;
calculating an evaluation value for each event type of the detected events; and
generating a ranking of a plurality of the event types of the detected events based on the evaluation value for each event type.

* * * * *